(12) United States Patent
Yamazaki

(10) Patent No.: US 8,861,032 B2
(45) Date of Patent: Oct. 14, 2014

(54) STEREOSCOPIC PRINT

(75) Inventor: Hideki Yamazaki, Saitama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 909 days.

(21) Appl. No.: 12/663,899

(22) PCT Filed: Nov. 7, 2008

(86) PCT No.: PCT/JP2008/070326
§ 371 (c)(1),
(2), (4) Date: Dec. 10, 2009

(87) PCT Pub. No.: WO2009/087810
PCT Pub. Date: Jul. 16, 2009

(65) Prior Publication Data
US 2010/0182687 A1    Jul. 22, 2010

(30) Foreign Application Priority Data

Jan. 8, 2008  (JP) .................................. 2008-001154
Aug. 27, 2008  (JP) .................................. 2008-217476

(51) Int. Cl.
*G06K 15/00* (2006.01)
*G03B 35/00* (2006.01)
*H04N 1/405* (2006.01)

(52) U.S. Cl.
CPC ..................... *G03B 35/00* (2013.01); *H04N 1/405* (2013.01)
USPC .............. 358/3.06; 358/1.8; 359/463; 347/43

(58) Field of Classification Search
USPC ....... 359/463; 358/3.06, 1.8; 355/77; 400/62, 400/82; 347/43, 40, 115
See application file for complete search history.

(56) References Cited

U.S. PATENT DOCUMENTS

| | | | | |
|---|---|---|---|---|
| 3,895,867 A | * | 7/1975 | Lo et al. | 355/77 |
| 5,777,757 A | * | 7/1998 | Karlsson et al. | 358/3.1 |
| 6,459,470 B1 | | 10/2002 | Iwano et al. | |
| 6,607,317 B2 | * | 8/2003 | Morozumi et al. | 400/82 |
| 2003/0011824 A1 | * | 1/2003 | Pilu | 358/3.06 |
| 2003/0067638 A1 | | 4/2003 | Yano | |
| 2007/0196153 A1 | * | 8/2007 | Bar Yona | 400/62 |
| 2011/0026115 A1 | | 2/2011 | Yamazaki | |

FOREIGN PATENT DOCUMENTS

| | | |
|---|---|---|
| JP | 09-061950 A1 | 3/1997 |
| JP | 09-237055 A1 | 9/1997 |
| JP | 2000-010049 A1 | 1/2000 |
| JP | 2001-042462 A1 | 2/2001 |
| JP | 2001-109088 A1 | 4/2001 |
| JP | 2003-111104 A1 | 4/2003 |
| JP | 2006-276678 A1 | 10/2006 |
| JP | 2007-233105 A1 | 9/2007 |

* cited by examiner

*Primary Examiner* — Audrey Y Chang
(74) *Attorney, Agent, or Firm* — Burr & Brown, PLLC

(57) ABSTRACT

The present invention provides stereoscopic prints with enhanced resolution and reduced image coarseness. A stereoscopic print comprises a lenticular lens sheet and a dot image print that is glued to the back surface of the lenticular lens sheet. The order of printing dots for the pixels of tone-representing smallest units with the use of a color plate is set at random. The dot printing order is the same among a given number of image strips forming an image strip group that are continuously arranged in a direction perpendicular to a longitudinal direction of half-cylindrical lenses so that dot printing is performed continuously on an area in which pixels to be printed are continuous.

1 Claim, 10 Drawing Sheets

STEREOSCOPIC PRINT

BACKGROUND OF THE INVENTION

1. Field of the Invention

The present invention relates to stereoscopic prints that involve the use of lenticular lenses and more particularly to dot printing technologies for producing dot image prints that are placed on the back of lenticular lenses and express color tones.

2. Description of Related Art

To make posters or advertisement prints more conspicuous to viewers for the purpose of promoting products or services, stereoscopic prints have heretofore been used, which involve the use of lenticular lenses so that the viewers can stereoscopically perceive symbolic images of the products or services. Such stereoscopic prints are produced by dividing images acquired at different angles into strips and arraying the strips on the back of lenticular lenses such that the strips are positioned along the half-cylindrical shapes of the lenticular lenses (for example, see Patent Documents 1 and 2).

Known dot printing methods for producing images to be placed on the back of lenticular lenses include FM (frequency-modulated) screening and AM (amplitude-modulated) screening (for example, see Patent Document 1). FM screening achieves tone representation by the density of dots of the same size, and AM screening, in contrast, by the size of dots. As shown in FIG. 10, another proposed method employs FM screening to randomly print dots A so that the dots A can be dispersed across image strips (see also Patent Document 2).

Patent Document 1: Japanese Patent Laid-Open No. H09-061950

Patent Document 2: Japanese Patent Laid-Open No. 2007-233105

It is desired to arrange as many image strips as possible for the viewer of a stereoscopic print to perceive a detailed stereoscopic image every time the viewer changes his or her viewing position horizontally. If so desired, it is also desirable to print the image of the stereoscopic print at the highest resolution of a printer or press printer. In the case of such random dot printing as in Patent Document 2, however, there are many dots around which no dot is printed. In such cases, a press printer may be unable to print uniform dots, or ink may not be transferred or adhered onto the paper if dots to be printed are considerably small as in the highest resolution of a press printer.

For example, when FM screening is employed to print dots at a resolution of 2,400 dpi with the use of a press printer, the width of an image strip is approximately 10 μm, and the size of a pixel is approximately 10 μm×10 μm. However, typical press printers involve considerable difficulty in printing dots of a size of 10 μm, and accordingly, ink may not be transferred onto the printing paper. This results in many pixels in which dots cannot be printed when dot printing is performed on sparsely distributed pixels such as the ones shown in FIG. 10. Therefore, common practice is to perform dot printing by doubling the size of a pixel, i.e., from 10 μm×10 μm to approximately 20 μm×20 μm, and by thus reducing the resolution to 1,200 dpi. In that case, the number of image strips arranged for one half-cylindrical lens of a lenticular sheet also needs to be reduced to half.

SUMMARY OF THE INVENTION

In view of the above, an object of the invention is thus to provide stereoscopic prints with enhanced resolution and reduced image coarseness.

A stereoscopic print according to the invention comprises: a lenticular sheet that is formed by arranging a plurality of half-cylindrical lenses in a continuous manner; and a dot image print arranged on the back surface of the lenticular sheet, the dot image print being formed by arranging a plurality of image strips in a continuous manner for the plurality of half-cylindrical lenses, wherein: the dot image print includes a plurality of smallest units that enable tone representation for the plurality of image strips; each of the plurality of smallest units includes a number of pixels; the order of printing dots for the pixels of the plurality of smallest units with the use of a color plate is set at random; dot printing order is the same among a given number of image strips forming an image strip group that are continuously arranged in a direction perpendicular to a longitudinal direction of the plurality of half-cylindrical lenses so that dot printing is performed continuously on an area in which pixels to be printed are continuous, the pixels to be printed being arranged in a direction perpendicular to a longitudinal direction of the plurality of half-cylindrical lenses.

In the above stereoscopic print, since the order of printing dots for the pixels of the plurality of smallest units with the use of a color plate is set at random, the dots can be dispersed, thereby reducing image coarseness. Moreover, since dot printing order is the same among a given number of image strips that are continuously arranged in a direction perpendicular to a longitudinal direction of the plurality of half-cylindrical lenses, pixels to be printed are determined in a direction perpendicular to a longitudinal direction of the plurality of half-cylindrical lenses. Because the dot image print is, by its nature, formed by acquiring images of a subject at different angles and continuously arranging the image strips of the images, visual information often slightly varies among the image strips that are arranged for one of the plurality of half-cylindrical lenses. This means that pixels to be printed form a continuous area, and in such an area, dots can be printed clearly and reliably even at a high resolution by a printer or press printer continuously printing dots.

In the above stereoscopic print, preferably, the range of the image strip group of the given number of image strips in which dot printing order is the same corresponds to the printing area for one of the plurality of half-cylindrical lenses. The above configuration in which dot printing order is determined based on the printing area for one of the plurality of half-cylindrical lenses allows dot printing order to be easily set for image strips.

More preferably, dot printing order is set at random so as to be different between two adjacently arranged image strip groups each of which includes a given number of image strips and is arranged for one of the plurality of half-cylindrical lenses. Such a configuration keeps the same random dot printing order from being set across the dot image print. Alternatively, dot printing order can be set at random so as to be different between two adjacently arranged image strip groups each of which includes a given number of image strips.

It is also preferred that the range of the image strip group of the given number of image strips in which dot printing order is the same be narrower than the printing area for one of the plurality of half-cylindrical lenses. By this configuration, pixels not to be printed do not appear in a continuous manner even if there are areas in which the same color tone is continuous. Thus, visually perceived image coarseness can be reduced.

In the above stereoscopic print, preferably, dot printing order for a given image strip is set at random so as to be different for each color plate. By this configuration, dots to be printed by each color plate can be dispersed, thereby dispersing colors to some extent and reducing the frequency at which the same color appears in a continuous manner. This in turn reduces visually perceived image coarseness.

It is also preferred that the range of the image strip group of the given number of image strips in which dot printing order is the same is positionally displaced for each color plate or differs in size for each color plate. By this configuration, dots to be printed by each color plate can be dispersed, thereby dispersing colors to some extent and reducing the frequency at which the same color appears in a continuous manner. This in turn reduces visually perceived image coarseness.

In accordance with the above-described invention, it is possible to provide stereoscopic prints with enhanced resolution and reduced image coarseness.

BRIEF DESCRIPTION OF THE DRAWINGS

FIGS. 1(A), 1(B), and 1(C) illustrate the method of producing a dot image print to be used for a stereoscopic print, wherein FIG. 1(A) shows how to acquire images of a subject with the use of a stereo camera, FIG. 1(B) shows how to divide the images acquired by the multiple cameras of the stereo camera to form a dot image print, and FIG. 1(C) is a diagram illustrating the dot image print formed by the divided image strips.

FIGS. 3(A) and 3(B) are diagrams to illustrate a stereoscopic print according to a first embodiment of the invention, wherein FIG. 3(A) illustrates a dot image print, and FIG. 3(B) shows the position of a lenticular sheet relative to the dot image print.

FIGS. 7(A) and 7(B) are diagrams to illustrate a stereoscopic print according to a second embodiment of the invention, wherein FIG. 7(A) illustrates a dot image print, and FIG. 7(B) shows the position of a lenticular sheet relative to the dot image print.

DETAILED DESCRIPTION OF THE INVENTION

Stereoscopic prints according to preferred embodiments of the invention will now be described with reference to the accompanying drawings.

First Embodiment

Figure 1:
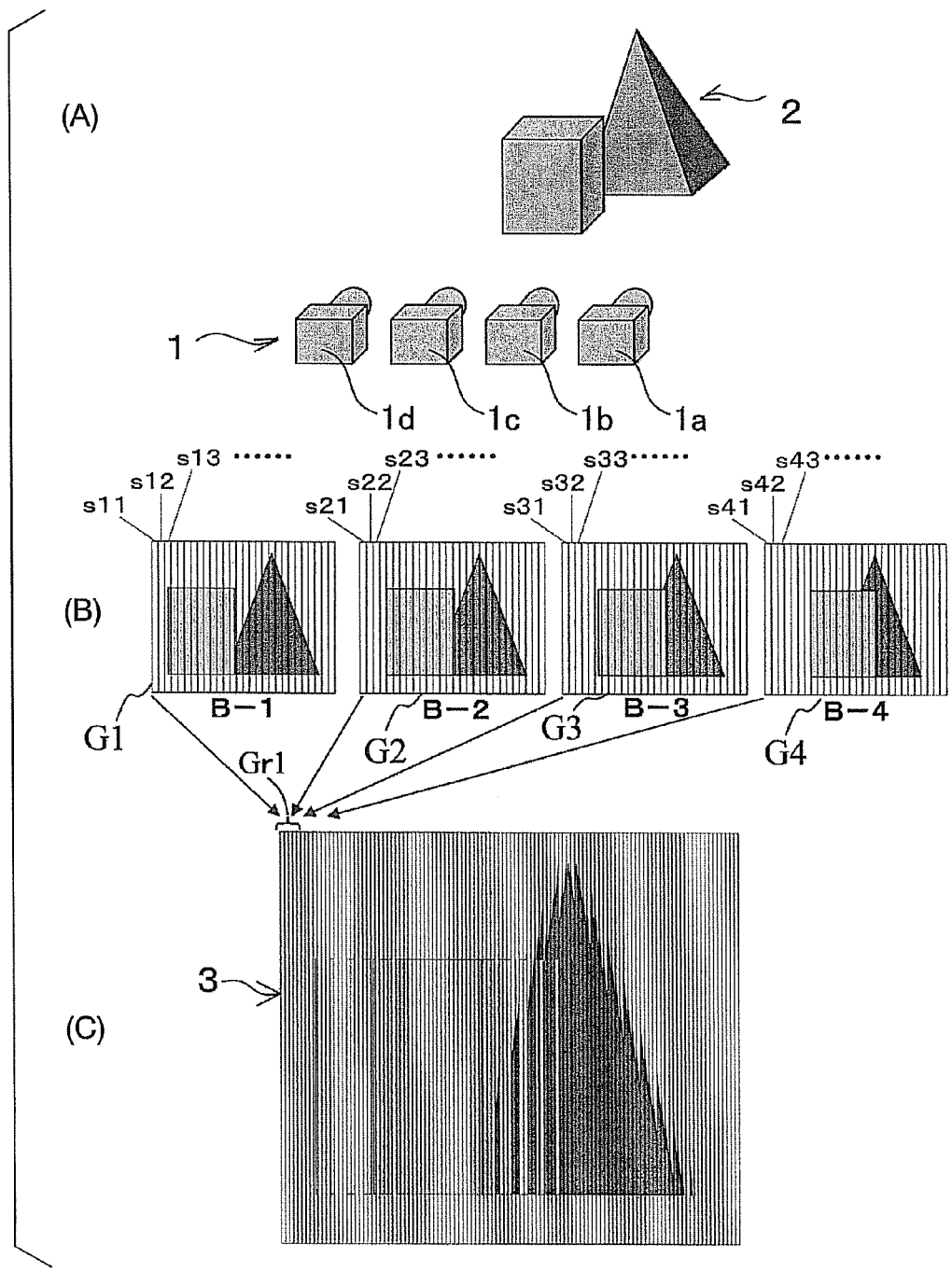

First, a stereoscopic print according to a first embodiment will be described. FIGS. 1(A) to 1(C) illustrate the method of producing a dot image print 3 to be used for a stereoscopic print. As shown in FIG. 1(A), cameras 1a, 1b, 1c, and 1d of a stereo camera 1 are arranged laterally to acquire images of a subject 2. FIG. 1(B) illustrates the images acquired by the respective cameras 1a, 1b, 1c, and 1d. 'B-1' of FIG. 1(B) illustrates an image G1 acquired by the camera 1a, 'B-2' an image G2 acquired by the camera 1b, 'B-3' an image G3 acquired by the camera 1c, and 'B-4' an image G4 acquired by the camera 1d. The images G1 to G4 are vertically divided into strips based on the number of half-cylindrical lenses of a lenticular sheet to be used.

As shown in FIG. 1(B), the image G1 of B-1 is divided into image strips s11, s12, s13, . . . (from left to right). Likewise, the image G2 of B-2 are divided into image strips s21, s22, s23, . . . ; the image G3 of B-3 into image strips s31, s32, s33, . . . ; and the image G4 of B-4 into image strips s41, s42, s43, . . . .

Then, as shown in FIG. 1(C), the leftmost image strips are taken one by one first from the image G1 and then from the images G2, G3, and G4 and arranged in this order. That is, the image strips are arranged in the order from s11, s21, s31, s41, s12, s22, s32, s42, s13, s23, s33, s43, s14, s24, s34, s44, to . . . (from left to right).

Assume then that the image strips s11, s21, s31, and s41 constitute a group Gr1; s12, s22, s32, and s42 a group Gr2; s13, s23, s33, and s43 a group Gr3; and s14, s24, s34, and s44 a group Gr4 (the same applies to the subsequent image strips). The dot image print 3 is formed by placing each group Gr on the back of each half-cylindrical lens of a lenticular sheet and by increasing or reducing the scales of the image strips constituting each group Gr vertically or horizontally such that the all the groups Gr cover the entire back surface of the lenticular lens sheet.

Figure 2:
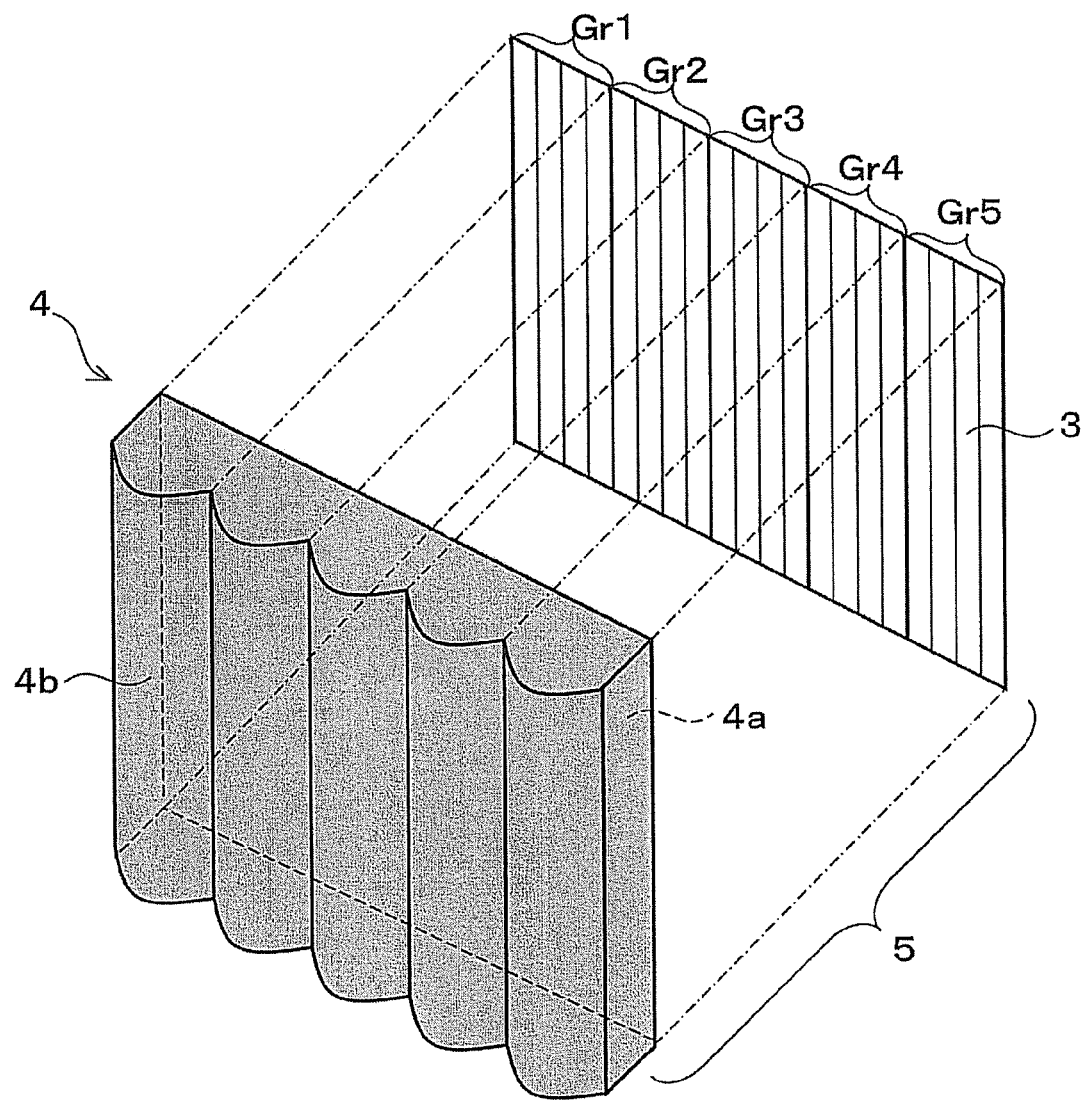
FIG. 2 is an exploded perspective view of a stereoscopic print.

With reference to FIG. 2, the placement of the dot image print 3 on the back surface 4a of a lenticular lens sheet 4 is discussed next. FIG. 2 is an exploded perspective view of a stereoscopic print 5. As shown in FIG. 2, the dot image print 3 is made up of the adjacently placed groups Gr. The image strips constituting each group Gr are aligned so as to fit the back surface 4a of a half-cylindrical lens 4b of the lenticular lens sheet 4 and then glued to the back surface 4a of that half-cylindrical lens 4b.

Figure 3:
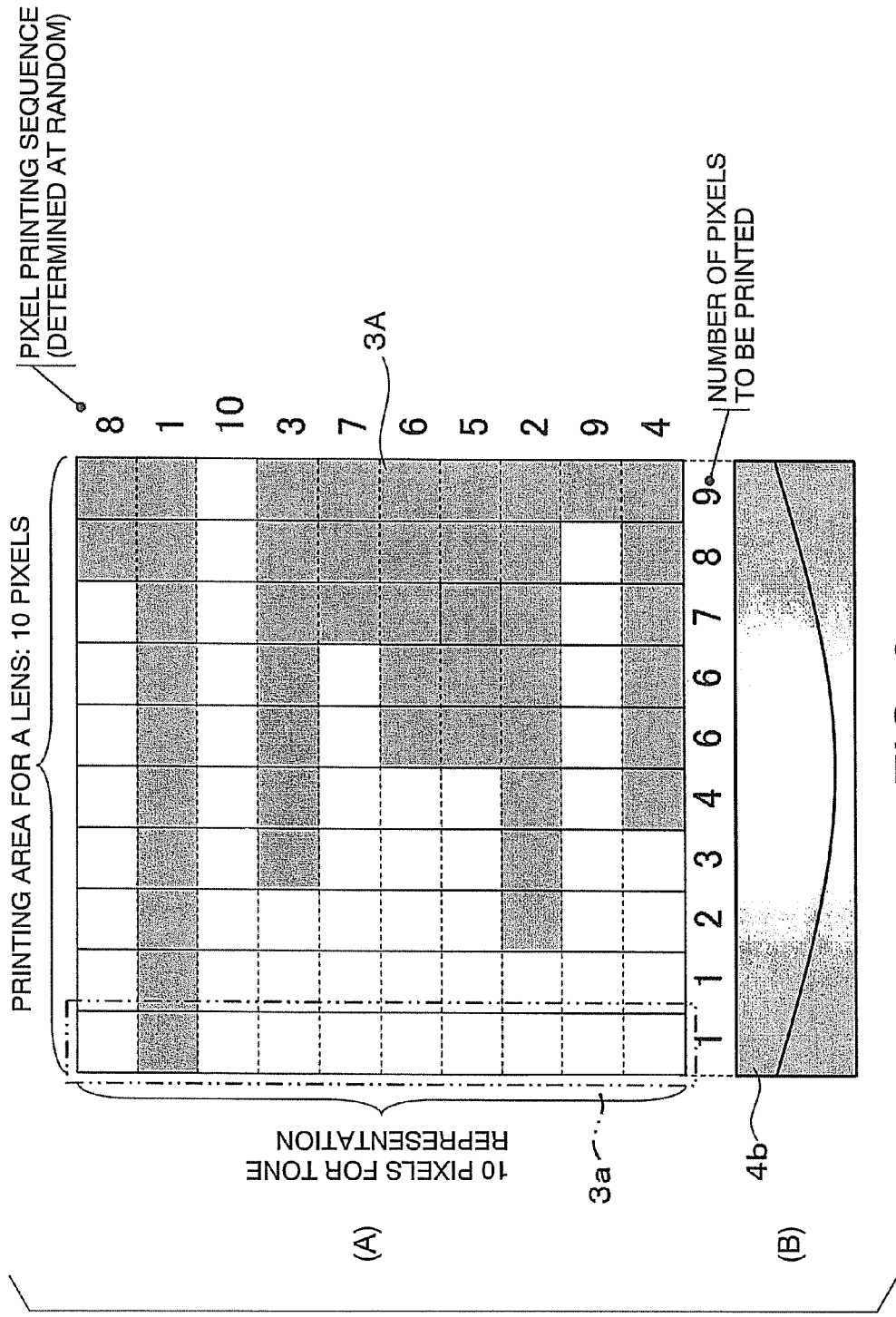

With reference now to FIG. 3, the method of forming a dot image print 3A (3) by dot printing is described. FIG. 3(A) is a diagram to illustrate dot printing for the dot image print 3A. FIG. 3(B) illustrates the positional relationship of a half-cylindrical lens 4b of the lenticular lens sheet 4 that is glued to the dot image print 3A.

The following explanation is based on the assumption that ten image strips are glued to the back surface of one half-cylindrical lens 4b and that each image strip consists of ten vertically aligned pixels and serves as a smallest unit (area) 3a that enables tone representation. As shown in FIG. 3(A), the ten image strips are arranged laterally, and each image strip consists of ten vertically aligned pixels. In producing the image strips, any one or more of color plates out of CMYK color plates are used to print dots in a lattice pattern according to the tone levels of the plate(s). Note that FIG. 3(A) illustrates printing positions only for one color plate. Also, note that the pixels shown in FIG. 3(A) are arranged such that each of the pixels is in contact with its adjacent pixels. Further, each of the pixels corresponds to a dot in dot printing.

In the example shown in FIG. 3(A), in printing dots on each tone-representing smallest unit 3a with the use of a particular color plate, the number of dots to be printed for each image strip is, from the leftmost image strip to the rightmost image strip, 1, 1, 2, 3, 4, 6, 6, 7, 8, and 9. Further, dot printing order is set at random for all the tone-representing smallest units 3a, or image strips. In the example shown in FIG. 3(A), the dot printing order for each image strip is, from the uppermost pixel to the lowermost pixel, 8th, 1st, 10th, 3rd, 7th, 6th, 5th, 2nd, 9th, and 4th. This order is only meant to be an example of the random dot printing order. Note that dot printing order is the same among the multiple image strips (one image strip group) that are continuously arranged for one half-cylindrical lens 4b in a direction perpendicular to a longitudinal direction of the half-cylindrical lens 4b (i.e., in a lateral direction of the half-cylindrical lens 4b).

Since dot printing order is the same among adjacently placed multiple image strips as above, pixels to be printed become continuous in a direction perpendicular to a longitudinal direction of the half-cylindrical lens 4b (i.e., in a lateral direction of the half-cylindrical lens 4b). Because the dot image print 3A is, by its nature, formed by acquiring images of a subject at different angles and continuously arranging the image strips of the images, visual information often slightly varies among the image strips that are arranged for one half-cylindrical lens 4b. This means that pixels to be printed form a continuous area, and in such an area, dots can be printed clearly and reliably in a well-adhering manner even at a high resolution by a printer or press printer continuously printing dots. Further, since the lateral range of image strips in which dot printing order is the same is equivalent to the width of one half-cylindrical lens 4b, dot printing order can be set with ease.

Figure 4:
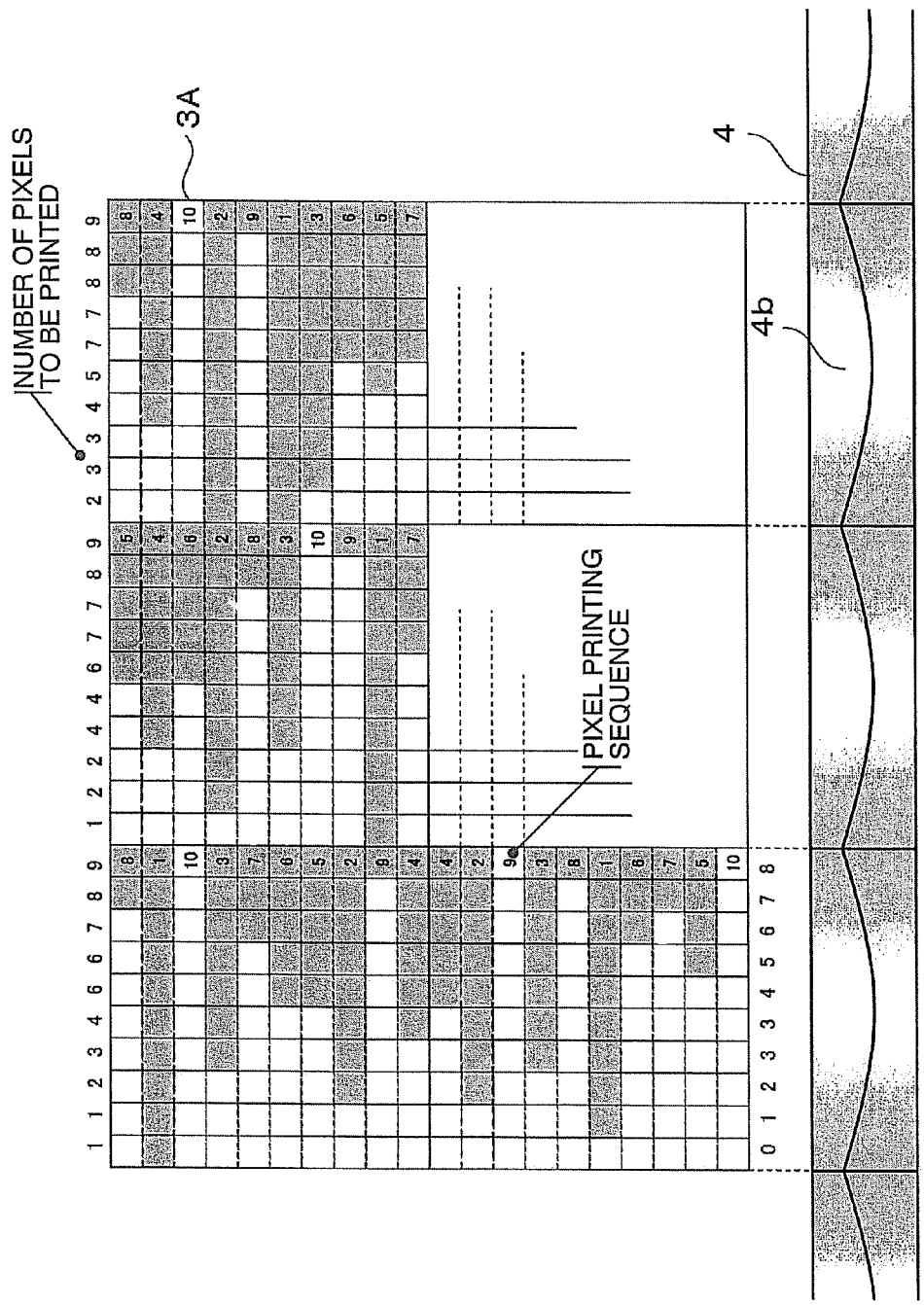
FIG. 4 shows the positional relationship between the dot image print of the stereoscopic print and the lenticular sheet.

As shown also in FIG. 4, dot printing order is the same among the multiple image strips (one image strip group) that are arranged for one half-cylindrical lens 4b in a direction perpendicular to a longitudinal direction of the half-cylindrical lens 4b (i.e., in a lateral direction of the half-cylindrical lens 4b). When attention is paid to a wider area of the dot image print 3A, however, dot printing order differs between the two image strip groups Gr1 and Gr2 that lie next to each other in a direction perpendicular to a longitudinal direction of the half-cylindrical lenses 4b (i.e., in a lateral direction of the half-cylindrical lenses 4b), which groups consist of a given number of image strips and are each arranged for one half-cylindrical lens 4b. Such a configuration keeps the same random dot printing order from being set across the dot image print 3A.

When the dot image print 3A is to be produced by multiple color plates selected from among CMYK plates, it is preferred that dot printing order for producing image strips be set at random for each color plate. With this method, dots to be printed by each color plate can be dispersed, thereby dispersing colors to some extent and reducing the frequency at which the same color appears in a continuous manner. This in turn reduces visually perceived image coarseness.

Figure 5:
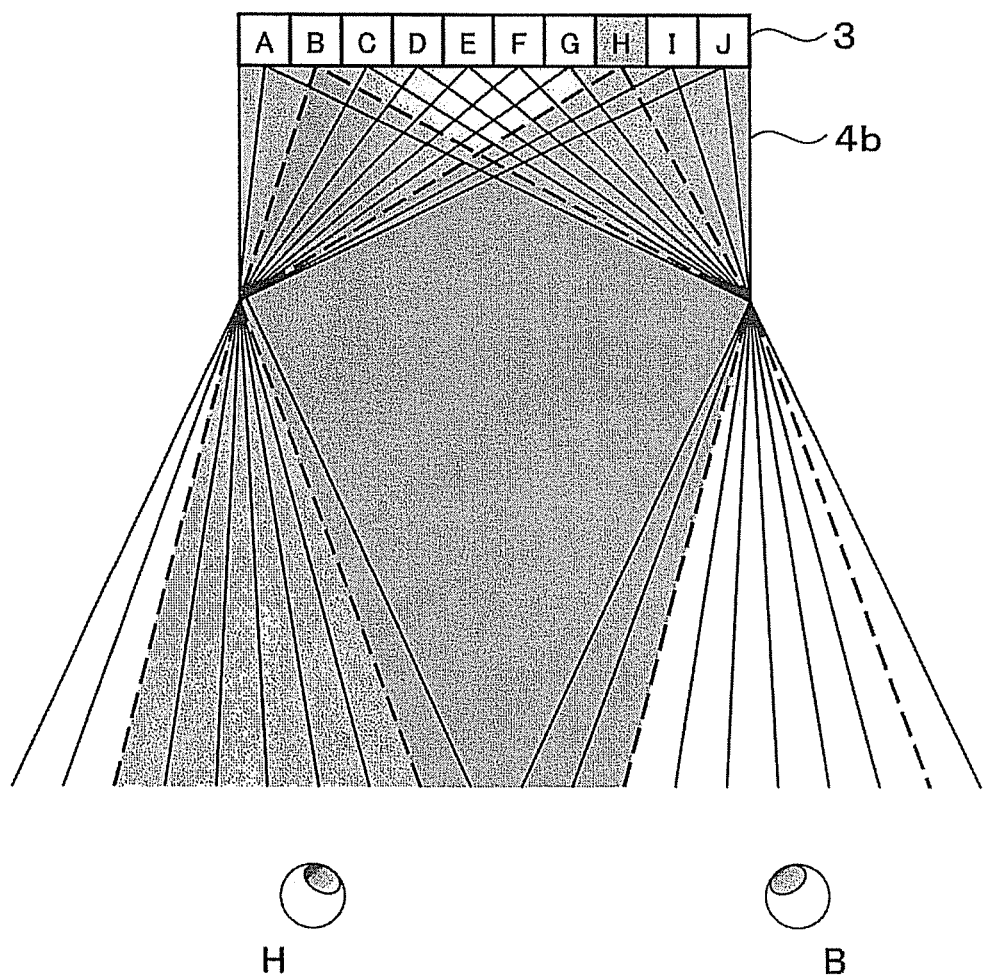
FIG. 5 illustrates viewing positions of the dot image print when viewed through the lenticular sheet.
Figure 6:
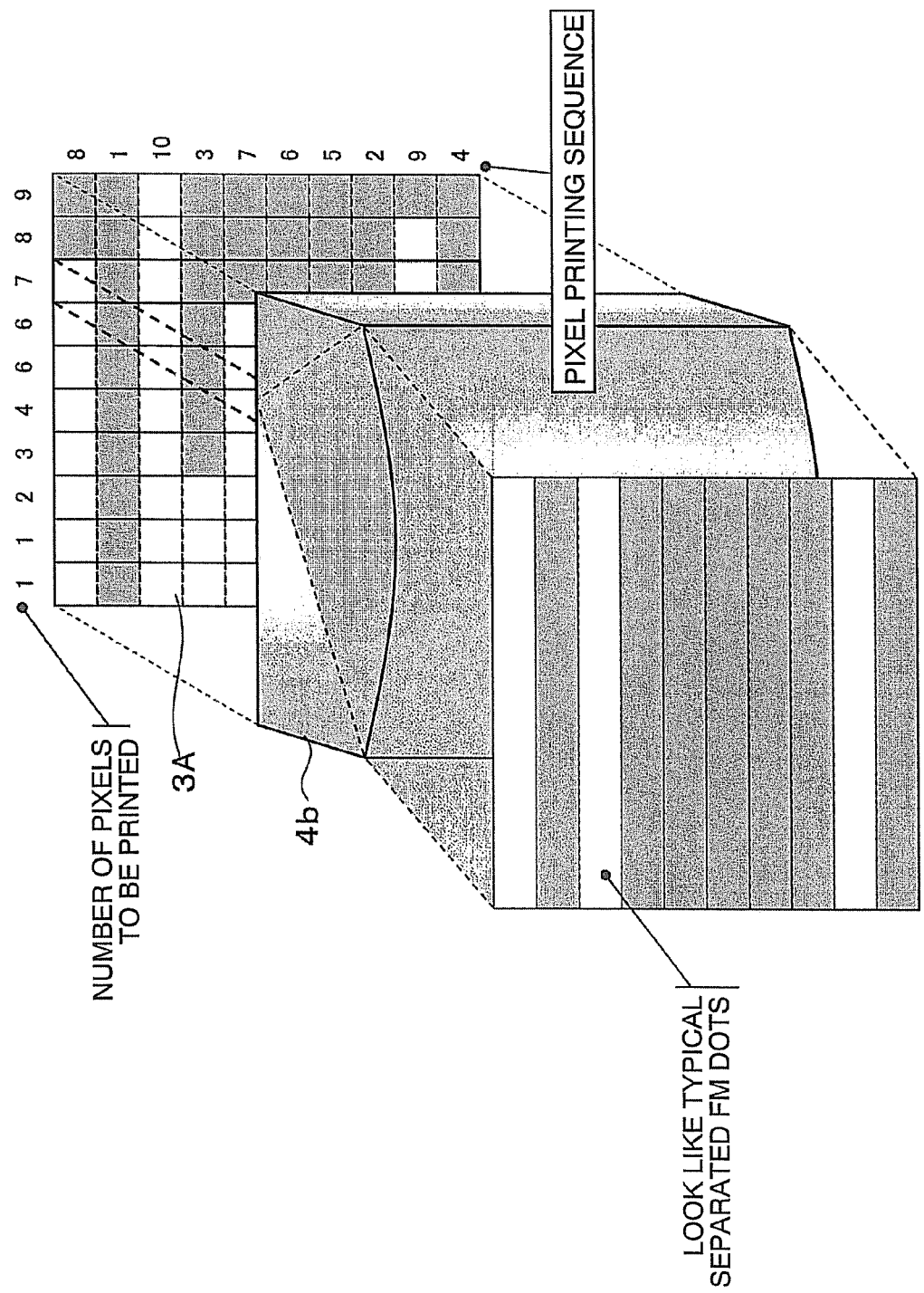
FIG. 6 shows how the viewer visually perceives the dot image print when viewing the dot image print through the lenticular sheet.

With reference now to FIGS. 5 and 6, the optical lens effect of the lenticular lens sheet 4 is discussed. As shown in FIG. 5, when the dot image print 3A is viewed through the lenticular lens sheet 4, part of the dot image print 3A can be seen enlarged. For example, an image strip B can be seen from a viewing point B, and an image strip H can be seen from a viewing point H. In other words, as shown in FIG. 6, when the dot image print 3A is viewed through the lenticular lens sheet 4 from a viewing point, only one vertically-extending image strip can be seen. Therefore, when the dot image print 3A is directly viewed without the lenticular lens sheet 4, the viewer cannot perceive the separation of FM dots. However, when the dot image print 3A is viewed through the lenticular lens sheet 4, the viewer can perceive an image strip whose FM dots are separated.

Second Embodiment

Figure 7:
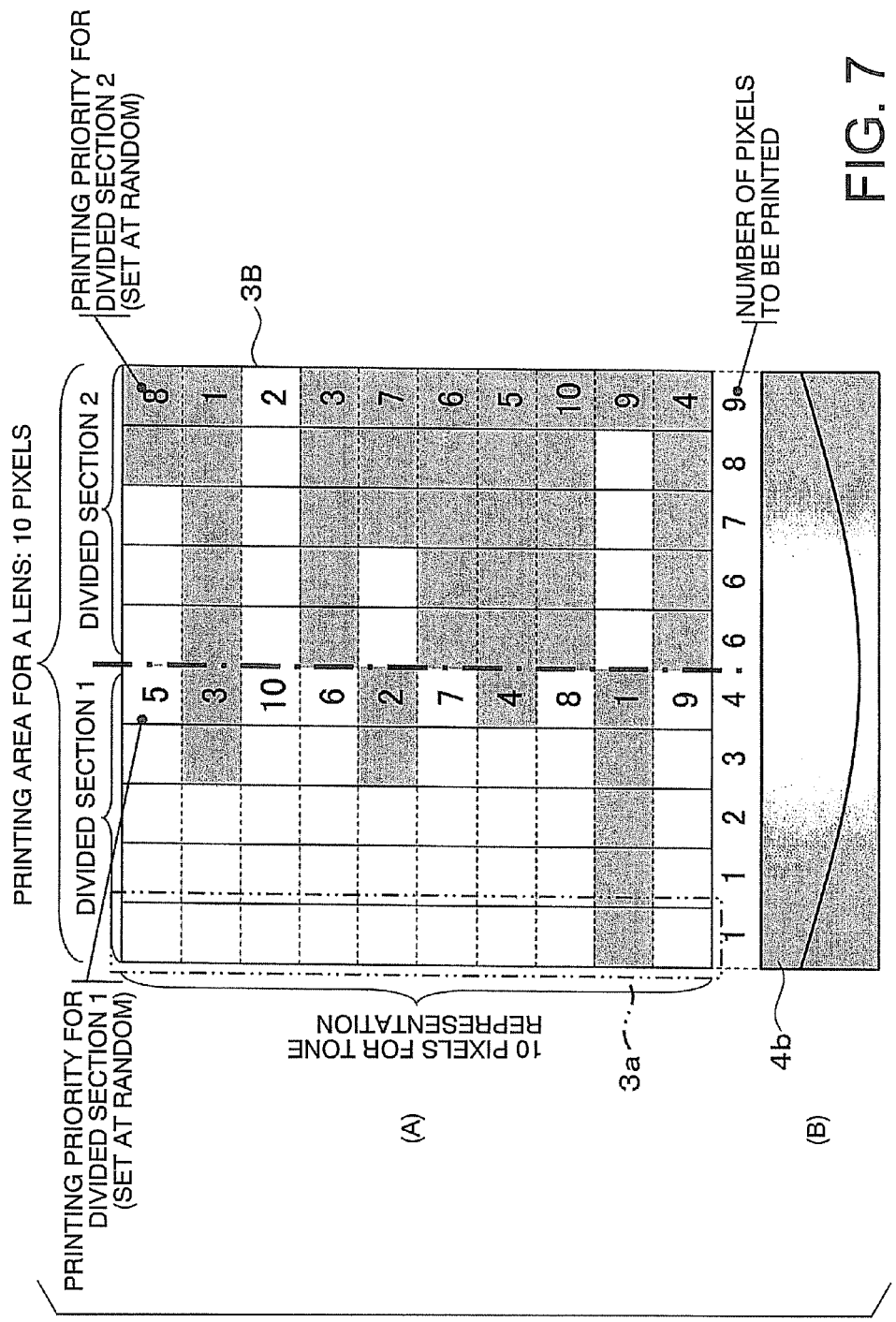

A stereoscopic print according to a second embodiment will now be described. The difference between the stereoscopic prints of the first and second embodiments lies in the arrangement of dots to form image strips. The rest is the same between the two. This arrangement of dots is described with reference to FIG. 7.

FIGS. 7(A) and 7(B) are diagrams to illustrate the stereoscopic print of the second embodiment. FIG. 7(A) illustrates a dot image print 3B (3), and FIG. 7(B) illustrates the position of the lenticular lens sheet 4 relative to the dot image print 3B. As shown in FIG. 7(A), ten image strips glued to the back of one half-cylindrical lens 4b are divided into two image strip groups: divided sections (image strip groups) 1 and 2. In printing dots on each tone-representing smallest unit 3a with the use of a particular color plate, dot printing order is set at random for all the tone-representing smallest units 3a in the divided section 1, and this dot printing order is the same among the tone-representing smallest units 3a in the divided section 1. Likewise, dot printing order is set at random for all the tone-representing smallest units 3a in the divided section 2, and this dot printing order is the same among the tone-representing smallest units 3a in the divided section 2. Note however that the above random dot printing orders differ between the divided sections 1 and 2.

For example, as shown in FIG. 7(A), the dot printing order for each image strip in the divided section 1 is, from the uppermost pixel to the lowermost pixel, 5th, 3rd, 10th, 6th, 2nd, 7th, 4th, 8th, 1st, and 9th. Unlike the above, the dot printing order for each image strip in the divided section 2 is, from the uppermost pixel to the lowermost pixel, 8th, 1st, 2nd, 3rd, 7th, 6th, 5th, 10th, 9th, and 4th.

Because the range of the divided sections 1 and 2 in which their respective image strip groups have the same random dot printing order are each narrower than the printing area for one half-cylindrical lens 4b (i.e., narrower than the width of one half-cylindrical lens 4b), pixels not to be printed do not appear in a continuous manner even if there are areas in which the same color tone is continuous. Thus, visually perceived image coarseness can be reduced. It should be noted that although an image strip group glued to the back surface of one half-cylindrical lens 4b is divided into two sections in the example shown in FIG. 7(A), the image strip group can instead be divided into three sections. In that case, too, dot printing order can be set differently for each of the three sections.

As stated above, since dot printing order is the same among the image strips that constitute one divided section, pixels to be printed appear in a continuous manner in a direction perpendicular to a longitudinal direction of a half-cylindrical lens 4b (i.e., in a lateral direction of the half-cylindrical lens 4b). This means that such pixels form a continuous area, and in such an area, dots can be printed clearly and reliably in a well-adhering manner even at a high resolution by a printer or press printer continuously printing dots.

When the dot image print 3B is to be produced by multiple color plates selected from among CMYK plates, it is preferred that dot printing order for producing image strips be set at random for each color plate. In that case, the number of divided sections in which their respective image strip groups have the same dot printing order can be set differently for each color plate, which means that the range in which the same dot printing order is set varies in size depending on color plates. Also, the range in which the same random dot printing order is set can be positionally displaced for each color plate. With the above methods, dots to be printed by each color plate can be dispersed, thereby dispersing colors to some extent and reducing the frequency at which the same color appears in a continuous manner. This in turn reduces visually perceived image coarseness.

Third Embodiment

A stereoscopic print according to a third embodiment will now be described. The difference between the stereoscopic print of the third embodiment and those of the first and second embodiments also lies in the arrangement of dots to form image strips. The rest is the same as in the first embodiment. This arrangement of dots is described with reference to FIG. 8.

Figure 8:
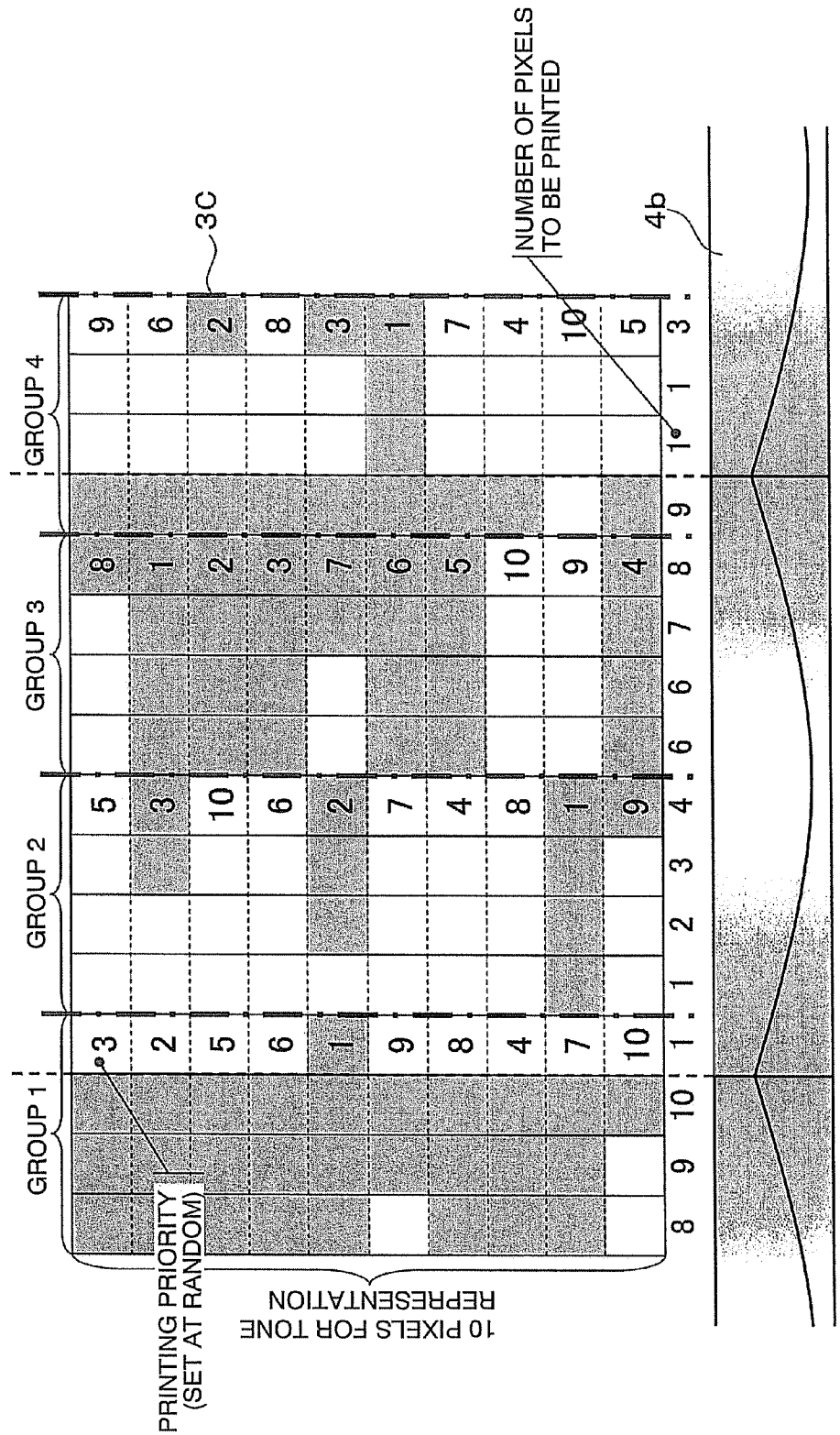
FIG. 8 shows the positional relationship between a dot image print of a stereoscopic print according to a third embodiment of the invention and a lenticular sheet.

In the above-described second embodiment, ten image strips glued to the back surface of one half-cylindrical lens 4b are divided into two sections, and the order of printing dots is set such that the dot printing order for the image strips that constitute one of the two sections is the same, and the dot printing order for the image strips that constitute the other section is also the same, but the above two dot printing orders are different. In the third embodiment, however, no consideration is given to the printing area for one half-cylindrical lens 4b (i.e., the width of a half-cylindrical lens 4b). As shown in FIG. 8, one image strip group in a dot image print 3C (3) consists of four adjacently arranged image strips. In printing dots with the use of a particular color plate, the same dot printing order is set for the image strips that constitute one image strip group. However, each image strip group has a different dot printing order.

For example, as FIG. 8 illustrates, the dot printing order for each image strip of a image strip group 1 is, from the uppermost pixel to the lowermost pixel, 3rd, 2nd, 5th, 6th, 1st, 9th, 8th, 4th, 7th, and 10th. The dot printing order for each image strip of a image strip group 2 is, from top to bottom, 5th, 3rd, 10th, 6th, 2nd, 7th, 4th, 8th, 1st, and 9th. The dot printing order for each image strip of a image strip group 3 is, from top to bottom, 8th, 1st, 2nd, 3rd, 7th, 6th, 5th, 10th, 9th, and 4th. The dot printing order for each image strip of a image strip group 4 is, from top to bottom, 9th, 6th, 2nd, 8th, 3rd, 1st, 7th, 4th, 10th, and 5th. As above, each group has a different dot printing order. In this case, because no consideration is given to the printing area for one half-cylindrical lens 4b (i.e., the width of a half-cylindrical lens 4b), a certain image strip group can extend across the boundary between two half-cylindrical lenses 4b.

As explained above, because the range of the groups in which their respective image strips have the same random dot printing order are each narrower than the printing area for one half-cylindrical lens 4b (i.e., narrower than the width of one half-cylindrical lens 4b), pixels not to be printed do not appear in a continuous manner even if there are areas in which the same color tone is continuous. Thus, visually perceived image coarseness can be reduced. It should be noted that although one image strip group consists of four adjacently arranged image strips in the example of FIG. 8, the number of image strips to form an image strip group can be set arbitrarily.

As stated above, since dot printing order is the same among the image strips that constitute one image strip group, pixels to be printed appear in a continuous manner in a direction perpendicular to a longitudinal direction of a half-cylindrical lens 4b (i.e., in a lateral direction of the half-cylindrical lens 4b). This means that such pixels form a continuous area, and in such an area, dots can be printed clearly and reliably in a well-adhering manner even at a high resolution by a printer or press printer continuously printing dots.

Figure 9:
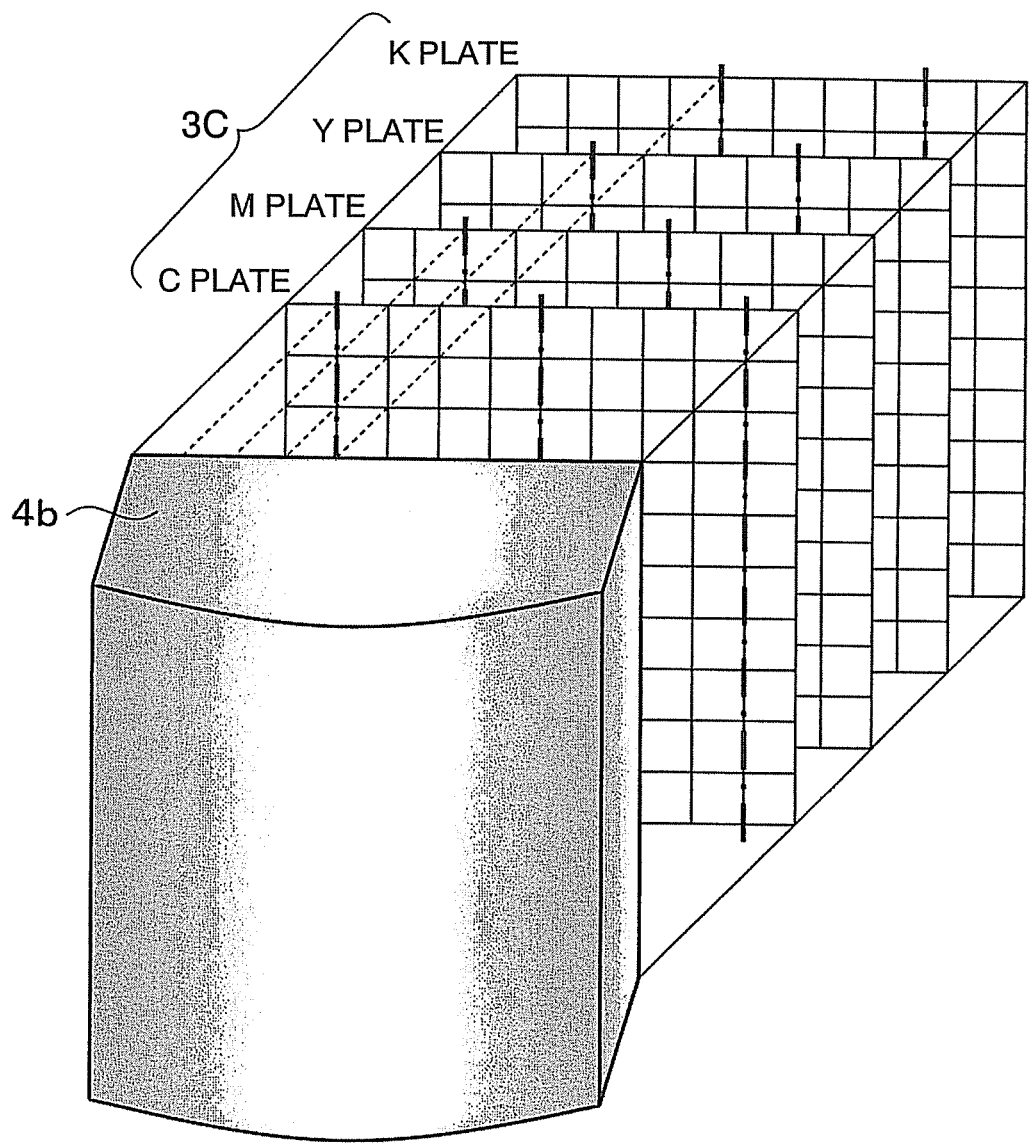
FIG. 9 is a conceptual diagram illustrating the arrangement of image strip groups for each color plate, which is used for dot printing to form a dot image print glued to the back surface of a half-cylindrical lens.
Figure 10:
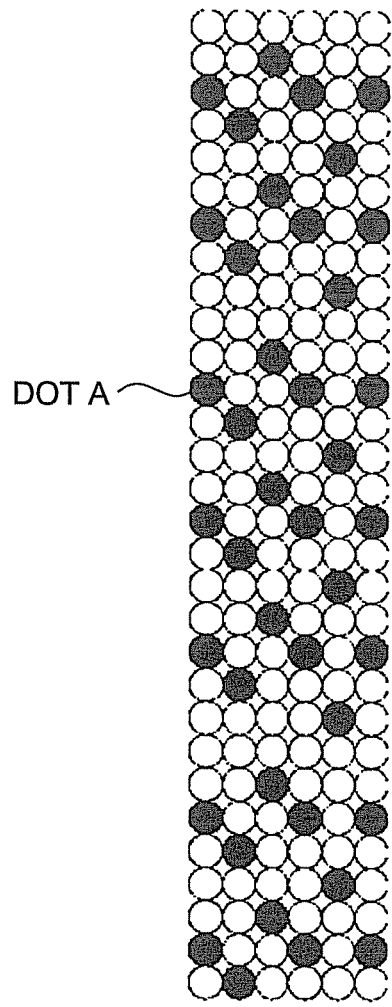
FIG. 10 illustrates dots of a dot image print which is used for a conventional stereoscopic print.

Discussed next is a case in which the dot image print 3C is produced by multiple color plates selected from among CMYK plates. FIG. 9 is a conceptual diagram illustrating the arrangement of image strip groups for a C plate, an M plate, a Y plate, and a K plate, which are used for dot printing to form the dot image print 3C glued to the back surface of a half-cylindrical lens 4b. In FIG. 9, each dashed-dotted line in each plate represents one boundary of an image strip group in which its image strips have the same dot printing order. As shown in FIG. 9, when the dot image print 3C is produced by multiple color plates, it is preferred that image strip groups in which their respective image strips have the same dot printing order be set so as to be horizontally displaced for each color plate. In addition to or instead of the above arrangement, it is preferred that dot printing order for a given image strip differ for each color plate. Also, the number of image strips to form an image strip can vary for each group. With the above methods, dots to be printed by each color plate can be dispersed, thereby dispersing colors to some extent and reducing the frequency at which the same color appears in a continuous manner. This in turn reduces visually perceived image coarseness.

Alternative Embodiments

It should be understood that the present invention is not limited to the above-described embodiments.

In each of the above-described embodiments, a dot image print that consists of as many image strips as necessary to represent image data is glued to the back surface of a lenticular lens sheet such that image strips fit the shape of each half-cylindrical lens of the lenticular lens sheet. However, the invention is not limited to the above arrangement as long as the image strips are arranged for the shape of the half-cylindrical lens. For instance, if a stereoscopic print is assumed to be viewed from an upper central direction of the print, it is also possible to arrange image strips such that the viewer can stereoscopically perceive the print via half-cylindrical lenses from that direction as well. In this case, the printing area for one half-cylindrical lens 4b (i.e., the width of an image strip group) differs depending on the position of that half-cylindrical lens even if half-cylindrical lenses are constant in pitch.

The invention claimed is:

1. A method for manufacturing a stereoscopic print, comprising:
   providing a lenticular lens sheet having, on a front surface thereof, a plurality of half-cylindrical lenses extending longitudinally along the lens sheet;
   using a plurality of color plates to form a dot image print by defining a plurality of unit areas on a back surface of the lenticular lens sheet, each having a width that is equal to the width of a half-cylindrical lens, and a length that is less than the length of a half-cylindrical lens, wherein the unit area has (i) a plurality of adjacent columns, each extending along the entire length of the unit area, and (ii) a plurality of adjacent rows each extending along the entire width of the unit area,
   using a first color plate to print dots in a plurality of the rows such that dots in adjacent columns contact one another, wherein the order of rows in which dots are printed using the first color plate is set at random, and
   using a second color plate to print dots in a plurality of the rows such that dots in adjacent columns contact one another, wherein the order of rows in which dots are printed using the second color plate is set at random,
   wherein in the rows where dots are printed, the first dot within the row is positioned in a column that defines one of the widthwise edges of the unit area; and fixing the dot image print to a back surface of the lenticular lens sheet, whereby the stereoscopic print is provided.

* * * * *